United States Patent
Philippson et al.

[15] 3,674,815
[45] July 4, 1972

[54] UNSATURATED 22-GUANIDYL STEROIDS

[72] Inventors: Rainer Philippson, Bergkamen; Helmut Hauser, Dortmund; Heinz Gibian, Berlin; Emanuel Kaspar, Kamen; Hans-Joachim Kessler, Berlin, all of Germany

[73] Assignee: Schering AG, Berlin, Germany

[22] Filed: April 30, 1970

[21] Appl. No.: 33,488

[30] Foreign Application Priority Data

April 30, 1969 Germany..................P 19 22 457.8

[52] U.S. Cl......................260/397, 260/239.5, 260/239.55, 260/397.3, 260/397.5, 260/999
[51] Int. Cl.......................................................C07c 169/38
[58] Field of Search..................../Machine Searched Steroids

[56] References Cited

UNITED STATES PATENTS

| | | | |
|---|---|---|---|
| 2,846,432 | 8/1958 | Nysted | 260/239.5 |
| 3,326,758 | 6/1967 | Irmscher et al. | 167/65 |

*Primary Examiner*—Henry A. French
*Attorney*—Millen, Raptes & White

[57] ABSTRACT

22-Guanidyl steroids of the formula

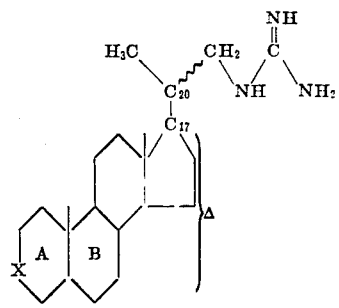

wherein X is

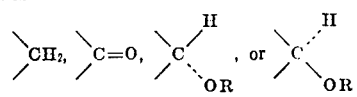

in which R is a hydrogen atom or an acid residue and $\Delta$ represents a double bond present in at least one of rings A and B and between carbon atoms $C_{17}$ and $C_{20}$, and the acid addition salts thereof, have anti-bacterial, anti-fungal and anti-trichomonadial activity.

14 Claims, No Drawings

UNSATURATED 22-GUANIDYL STEROIDS

BACKGROUND OF THE INVENTION

This invention relates to novel 22-guanidyl steroids.

SUMMARY OF THE INVENTION

This invention relates to compounds of the formula

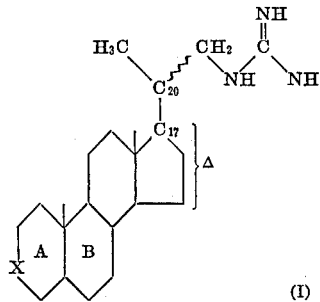

(I)

wherein X is

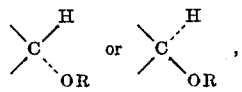

in which R is a hydrogen atom or an acid residue, and Δ represents a double bond present in at least one of rings A and B and between carbon atoms $C_{17}$ and $C_{20}$, and to the salts thereof.

DETAILED DISCUSSION

The compounds of this invention have a methylene ($X = CH_2$), keto ($X = CO$) or hydroxy or esterified hydroxy ($X = CHOR$) group at the three-position of the steroid molecule.

The compounds of this invention include 3-hydroxy steroids in which the hydroxy group is in the α- or β-position, both in the free hydroxy form (R = H) and in esterified form (R = an acid residue). Suitable acid residues are those acids customarily employed for esterifications in steroid chemistry, e.g., mono-, di and polybasic organic acids. Preferred organic acids are pharmaceutically acceptable monobasic acids containing up to 15 carbon atoms, preferably carboxylic and especially aliphatic carboxylic acids. Such acids can be saturated or unsaturated, straight chain or branched, mono-, di or polybasic, and substituted in the usual manner, e.g., by hydroxyl, an amino group and/or halogen atom. In addition to aliphatic acids, also suitable are cycloaliphatic, aromatic, mixed aromatic-aliphatic and heterocyclic acids, which acids can likewise be substituted in the usual fashion.

Preferred acids for forming the compounds of formula I in which R is an acid residue include acetic acid, propionic acid, caproic acid, enanthic acid, undecylic acid, oleic acid, trimethylacetic acid, a haloacetic acid, e.g., chloroacetic acid, cyclopentylpropionic acid, phenylpropionic acid, phenylacetic acid, phenoxyacetic acid, dialkylaminoacetic acid, piperidinoacetic acid, succinic acid and benzoic acid and other pharmaceutically acceptable acids.

Examples of compounds of formula I in which X is an esterified hydroxy methylene group are those in which the ester group is an acyloxy group containing one to 14, preferably one to seven carbon atoms and zero to four, preferably zero to one, rings and zero to three, preferably zero to two, heteroatoms. Examples of esterified 3-hydroxy groups are 3-acyloxy groups wherein the acyl group is the acyl radical of, for example, an aryl or alkaryl acid, e.g., benzoic, 2,3- or 4-methylbenzoic, 2,3-, 2,4-, 2,5-, 2,6-, 3,4- and 3,5-dimethylbenzoic, ethylbenzoic, 2,4,6-trimethyl-benzoic, 2,4,6-triethylbenzoic, α-naphthoic, 3-methyl-α-naphthoic, an aromatic hydroxyacid, e.g., salicylic acid, an aromatic aminoacid, e.g., para-aminosalicylic, para-aminobenzoic, other aromatic hetero-substituted acids, e.g., 2,3,4-trimethoxybenzoic, carbamic acids, e.g., carbamic acid, phenyl-carbamic, n-butylcarbamic, dimethylcarbamic, diethylcarbamic, allophanic, or a heterocyclic acid, e.g., β-furyl-carboxylic, N-methyl-pyrrolidyl-2-carboxylic, α-picolinic, indole-2-carboxylic, 6-hydroxy-indolyl-3-acetic, N-methylmorpholyl-2-carboxylic lysergic, pyrrolyl-2-carboxylic, or other acyl acid.

Also included as compounds of this invention are those wherein X is an esterified hydroxymethylene group in which the ester is an ester of an inorganic acid, e.g., sulfuric and phosphoric acid, both in free acid and salts of alkali and alkaline earth metals, e.g., Na and Ca.

The compounds of this invention contain at least one C C double bond in the steroid molecule in the A ring, B ring or between the $C_{17}$- and $C_{20}$-carbon atoms, i.e., a $\Delta^1$—, $\Delta^2$—, $\Delta^3$—, $\Delta^4$—, $\Delta^5$—, $\Delta^{5(10)}$—, $\Delta^6$—, $\Delta^7$—, $\Delta^8$—, $\Delta^{8(14)}$—, $\Delta^{9(10)}$—, or $\Delta^{17(20)}$ double bond. They can contain a plurality of such double bonds, such as, for example, $\Delta^{1,4}$—, $\Delta^{3,5}$—, $\Delta^{4,6}$—, $\Delta^{1,3,5(10)}$, or $\Delta^{4,6,17(20)}$, unsaturation. Obviously, the $CH_3$ group is absent in compounds containing a $\Delta^{5(10)}$ or $\Delta^{9(10)}$ double bond. Additionally, double bonds can also be present in the C- and D-rings of the steroid molecule, such as, for example, a $\Delta^{9(11)}$—, $\Delta^{11(12)}$—, $\Delta^{14(15)}$—, and/or $\Delta^{16(17)}$—double bond.

The compounds of this invention which lack a $\Delta^{4(5)}$ or $\Delta^{5(6)}$ double bond include those in which the 5-hydrogen atom has either α- or β-configuration, i.e., ring A is in either the cis- or trans-configuration with ring B. Similarly, the side chain at the carbon atom $C_{20}$ can be in the R- or S-configuration.

Equivalents of the compounds of this invention having a keto group in the three-position are those in which the keto group is in the form of a functional derivative thereof regenerable to a keto group, e.g., di-lower-alkyl or alkylene ketals, thioketals, hemi-thioketals, enol ethers, thioenol ethers, enol acylates, and enamines, preferably containing one to eight carbon atoms, e.g., dimethyl, diethyl, ethylene, trimethylene and propylene ketals and thioketals, phenylthioketal, methyl, ethyl and benzyl enol and thioenol ethers, β-hydroxyethyl thioenol ether, enol acetate and pyrrolidyl, piperidyl and morpholyl enamines. It will be apparent to those skilled in the art that such functional groups can readily be formed only when the A ring is saturated or contains a single double bond conjugated with the keto group.

This invention is directed primarily to steroids of the natural series, i.e., the d-optical isomers having an angular methyl group at the 13-position. However, the d and l-isomers and the d,l-racemic mixtures of synthetic steroids containing an ethyl, i-propyl or n-propyl group at the 13-position also possess antibacterial, anti-fungal and anti-trichlomonadial activity.

Preferred sub-classes of compounds of this invention are those meeting any or all of the following definitions:

a. the substituent at the three-position is (i) a hydroxy group, i.e., >CHOH, or
(ii) a methylene group, i.e., >$CH_2$;

b. Rings A and B contain as unsaturation a single double bond, preferably $\Delta^2$, $\Delta^3$ or $\Delta^5$;

c. a double bond is present between the $C_{17}$ and $C_{20}$ carbon atoms;

d. those in the form of their acid addition salts, preferably the acetate.

The process aspect of this invention relates to processes for the preparation of compounds of formula I and the salts thereof, in which:

a. a compound of the formula

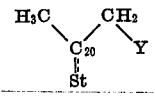

(II)

wherein Y is —$NH_2$, St is the above-defined steroid structure attached by its $C_{17}$ carbon atom, and $C_{20}$ — St is a single bond or a double bond between the $C_{20}$-carbon atom and the steroid nucleus St, is reacted with an S-alkyl- or S-aralkylisothiourea, the latter preferably being in the form of a salt thereof; or b. a compound of formula II, preferably in the form of the ammonium salt thereof, is reacted with cyanamide; or c. a compound otherwise corresponding to formula II but wherein Y is a sulfonic acid residue, e.g., p-toluenesulfonate and methane sulfonate, is reacted with a guanidinium salt and, if desired, the free base is thereafter prepared therefrom by conventional methods; or d. the free base is converted into the corresponding acid addition salt with any desired acid, or vice versa.

Both inorganic and organic acids are suitable for the formation of an acid addition salt of a compound of formula I. Examples are hydrochloric acid, sulfuric acid, phosphoric acid, formic acid, acetic acid, butyric acid, caproic acid, oxalic acid, succinic acid, benzoic acid, and especially gluconic acid, heptagluconic acid, D-glucuronic acid, galacturonic acid, pelargonic acid, lactic acid and other pharmaceutically acceptable acids. Other acids can be employed to produce acid addition salts useful for isolation, purification and/or characterization purposes.

In process (c), any sulfonic acid group can be employed as the sulfonic acid group Y. However, tosylate or mesylate is preferred.

When introducing the 22-guanidyl group according to process (a) with an S-alkyl- or with an S-aralkylisothiourea, an alkyl- or aralkyl-mercaptan, respectively, is liberated during the course of the reaction. Since such reactions are known to be suitably conducted at an elevated temperature, e.g., the boiling temperature of the solvent employed, especially well suited as the reactant is an S-alkylisothiourea, e.g., S-methylisothiourea, since the thus-formed, volatile S-alkyl mercaptan distills out of the reaction mixture during the course of the reaction, thus eliminating the need for special procedures for its removal from the reaction product.

The novel unsaturated 22-guanidyl steroids are effective against bacteria, fungi and trichomonads. In particular, they exhibit a good effect against pathogenic yeasts and dermatophytes, including *Candida albicans*, *Microsporum gypseum*, *Trichophyton mentagrophytes*, *Epidermophyton floccosum*, and against trichomonads, including *Trichomonas vaginalis*. They are also effective against gram-positive bacteria, such as, for example, against *Staphylococcus aureus*.

The compounds of this invention are more effective than conventional substance nystatin (I) against pathogenic yeasts, as can be seen from their in vitro effectiveness against *Candida albicans*, as shown in Table 1.

TABLE 1

| Number | Compound | Relative Effectiveness Against *Candida albicans* |
|---|---|---|
| I | Nystatin | 1 |
| II | (3β-Hydroxy-23,24-bisnor-5-cholen-22-yl)-guanidinium acetate | 16 |
| III | (23,24-Bisnor-5α-chola-2,17(20)-dien-22-yl)-guanidinium acetate | 16 |
| IV | (23,24-Bisnor-5α-chol-3-en-22-yl)-guanidinium acetate | 4 |

The data shown in Table 1 were obtained in the conventional small-tube-dilution test in which the inhibitory effect of the comparison compound I is assigned the value 1 and the values shown for the novel compounds II, III and IV is the number of times more effective they are compared to compound I.

An example of the high in vitro effectiveness of the compounds of this invention against pathogenic skin fungi is shown in the following Table 2 which gives the effectiveness of two compounds of this invention against *Trichophyton mentagrophytes* compared with the conventional compound griseofulvin.

TABLE 2

| Number | Compound | Relative Effectiveness Against *Trichophyton mentagrophytes* |
|---|---|---|
| V | Griseofulvin | 1 |
| II | (3β-hydroxy-23,24-bisnor-5-cholen-22-yl)-guanidinium acetate | 4 |
| III | (23,24-bisnor-5α-chola-2,17(20)-dien-22-yl)-guanidinium acetate | 2 |

The values in Table 2 were determined in the same manner as those in Table 1.

It can be seen from Tables 1 and 2 that the compounds of this invention have a broad spectrum of chemotherapeutic effectiveness.

The compounds of this invention can be administered topically or orally, as indicated by the nature of the disease, in the treatment of dermatomycoses and other skin diseases caused by infections of the skin by bacteria, yeast and fungi, onychomycoses, yeast infections of the gastrointestinal, respiratory and urogenital tracts, and septic conditions. In particular, they are also well suitable for the treatment of mixed infections, due to their broad spectrum of activity. For this purpose, they can be formulated into conventional drug forms with the additives, carrier substances, and flavoring agents customary in pharmaceutical preparations which do not deleteriously react with the effective agents, employing conventional methods. For oral application, particularly suitable are tablets, dragees, capsules, pills, suspensions and solutions. Such compositions can employ, for example, water, alcohol, polyethylene glycols, gelatin, sucrose, lactose, amylose in solutions and suspensions and magnesium stearate, talc, starch, sugars, etc., in tablets.

For topical application, the compounds of this invention can be applied as a powder, tincture, solution, suspension, spray, foam or aerosol or as vaginal tablets and suppositories.

The concentration of the effective agent in the thus-formulated topical compositions is dependent on the activity of the specific compound employed, the responsiveness of the individual patient and the mode of administration. For oral administration, they usually contain about 0.1 to 5 g., preferably about 0.3 to 1.5 g. of a compound of this invention and 0.1 to 10 g. of a pharmaceutical carrier per daily dose. For topical administration, concentrations of the compound of formula I in the pharmaceutical carrier are preferably about 0.1 to 5 percent. Particularly preferred are pharmaceutical preparations containing a compound of this invention adapted for topical administration, especially those conventionally employed in the treatment of skin diseases.

The starting compunds for the above-described processes which have not been described herefore can be produced in a conventional manner by preparing a 20-hydroxy-20-cyano-steroid from a 20-keto-steroid with acetone cyanohydrin, from which product, by splitting off water, for example, with phosphorus oxychloride in pyridine, the $\Delta^{17(20)}$-20-carbonitrile compound is formed. The latter compound is then reduced with lithium aluminium hydride, preferably at the boiling temperature, to the 22-amine.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

1.4 g. of 22-amino-23,24-dinor-5β-chol-3-ene is heated in 16 ml. of ethanol and mixed with a solution of 0.6 g. of S-methylisothiourea acetate in 6 ml. of water; thereafter, the reaction mixture is heated under reflux for 6 hours. Then, the reaction mixture is concentrated to dryness, with the addition of benzene, and the reaction product is heated to the boiling temperature with 80 ml. of ethyl acetate for 30 minutes. After cooling, the reaction product is vacuum-filtered and recrystallized from acetone/glacial acetic acid, thus obtaining 0.7 g. of (23,24-dinor-5β-chol-3-en-22-yl)-guanidinium acetate, m.p. 201°–203° C. (decomposition).

EXAMPLE 2

Analogously to Example 1, after conducting a working-up step and a recrystallization step along the same lines, 0.31 g. of (23,24-dinor-5-cholen-22-yl)-guanidinium acetate, m.p. 196°–197° C. (decomposition) is obtained from 1.35 g. of 22-amino-23,24-dinor-5-cholene, 0.67 g. of S-methylisothiourea acetate in 40 ml. of ethanol, and 15 ml. of water.

EXAMPLE 3

Analogously to Example 1, after conducting a working-up step and subsequent treatment with ethyl acetate along the same lines, 0.3 g. of (23,24-dinor-5α-chola-2,17(20)-dien-22-yl)-guianidinium acetate, m.p. 162°–165° C. is obtained from 1 g. of 22-amino-23,24-dinor-5α-chola-2,17(20)-diene (produced from 3β-acetoxy-5α-pregn-17(20)-ene-20-carbonitrile by saponification to the 3-hydroxy-compound, tosylation to the 3-tosyloxy-compound, splitting off p-toluenesulfonic acid to form 5α-pregna-2,17(20)-diene-20-carbonitrile and reduction) and 0.5 g. of S-methylisothiourea acetate.

EXAMPLE 4

1.35 g. of (23,24-dinor-5-cholen-22-yl)-ammonium acetate is dissolved in 13.5 ml. of isopropanol/water (1:1). Then, 0.67 g. of cyanamide in 6.7 ml. of water is allowed to drop into the reaction solution, and thereafter the reaction mixture is heated under reflux for 16 hours. Subsequently, 0.6 g. of cyanamide in 0.6 ml. of water is added thereto, and the reaction mixture heated under reflux for another 3 hours. After cooling, the reaction mixture is first concentrated to dryness with the addition of benzene, then the crude product is treated with hot acetone, and finally recrystallized from ethanol/isopropyl ether, thus obtaining 0.55 g. of (23,24-dinor-5-cholen-22-yl)-guanidinium acetate, m.p. 196°–197° C. (decomposition).

EXAMPLE 5

Analogously to Example 4, after conducting a working-up step and a recrystallization along the same lines, 1.2 g. of (20 R)-(3β-hydroxy-23,24-dinor-5-cholen-22-yl)-guanidinium acetate is obtained, m.p. 238°–242°C. (decomposition), from 5.4 g. of (20 R)-(3β-hydroxy-23,24-dinor-5-cholen-22-yl)-ammonium acetate and 2.75 g. of cyanamide in 55 ml. of isopropanol/water (1:1).

EXAMPLE 6

Analogously to Example 1, 0.94 g. of (23,24-dinor-5α-chol-3-en-22-yl)-ammonium acetate and 0.47 g. of S-methylisothiourea acetate are reacted in 40 ml. of ethanol and 10 ml. of water. After working up and recrystallizing in an analogous manner, 0.32 g. of (23,24-dinor-5α-chol-3-en-22-yl)-guanidinium acetate is obtained, m.p. 198°–203° C. (decomposition).

EXAMPLE 7

0.58 g. of 50 percent dispersion of sodium hydride in paraffin oil and 1.25 g. of guanidine hydrochloride are heated to reflux in 40 ml. of dried tert.-butanol for 30 minutes, filtered in the hot state, and immediately added dropwise to a solution of 3.0 g. of 22-tosyloxy-23,24-dinor-5α-chol-3-ene in 100 ml. of absolute tert.-butanol. After heating for 7 hours under reflux, the solvent is driven off under a vacuum, and the residue is mixed with 40 ml. of 5 percent methanolic KOH. After dilution with water, the free guanidine precipitates, which is vacuum-filtered and quickly dried. Thereupon, this product is taken up in methanol and mixed with glacial acetic acid. By means of isopropyl ether, the (23,24-dinor-5α-chol-3-en-22-yl)-guanidinium acetate is precipitated, m.p. 198°–20 3° C. (decomposition).

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. The following examples will serve to illustrate preferred embodiments of the pharmaceutical composition of the present invention, without limiting the invention to the specific details of the examples.

EXAMPLE 8

| | |
|---|---|
| 500 mg | (3β-Hydroxy-23,24-bisnor-5-cholen-22-yl)-guanidinium acetate |
| 82 mg | corn starch |
| 3 mg | polyvinylpyrrolidone |
| 13 mg | talcum |
| 2 mg | magnesium stearate |
| 600 mg | Total | are pressed into a tablet formed with groove to permit easy breaking into two substantially equal halves.

EXAMPLE 9

1 g finely comminuted (23,24-Bisnor-5α-chola-2,17(20)-dien-22-yl)-guanidinium acetate is homogeneously dispersed in a single phase ointment base of the following composition:

| | |
|---|---|
| 61 g | highly viscous paraffin oil |
| 20 g | hard paraffin |
| 18 g | soft petroleum jelly |
| 99 g | Total |

What is claimed is:
1. A compound of the formula

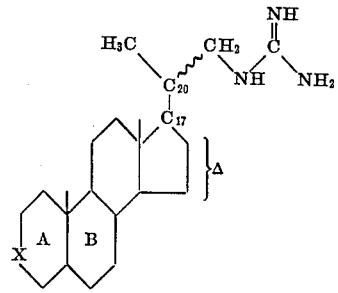

wherein X is a member of the group consisting of >CH₂, >C=O,

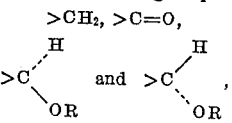

wherein R is a hydrogen atom or an acyl radical of a pharmaceutically acceptable monobasic organic acid of up to 15 carbon atoms, and Δ represents at least one double bond in ring A, ring B, or between the $C_{17}$ and $C_{20}$ carbon atoms, and the acid addition salts thereof.

2. A compound of claim 1 wherein the substituent at the 3-position is

3. A compound of claim 1 wherein the substituent at the 3-position is

4. A compound of claim 1 containing as unsaturation in rings A and B a single double bond.

5. A compound of claim 4 wherein the double bond is a $\Delta^2$, $\Delta^3$ or $\Delta^5$ double bond.

6. A compound of claim 1 containing a $\Delta^{17(20)}$—double bond.

7. A compound of claim 1 in acid addition salt form.

8. A compound of claim 7 wherein the acid addition salt is the acetate.

9. A compound of claim 1, (23,24-bisnor-5β-chol-3-en-22-yl)-guanidinium acetate.

10. A compound of claim 1, (23,24-bisnor-5-cholen-22-yl)-guanidinium acetate.

11. A compound of claim 1, (23,24-bisnor-5α-chola-2,17(20)-dien-22-yl)-guanidinium acetate.

12. A compound of claim 1, (23,24-bisnor-5-cholen-22-yl)-guanidinium acetate.

13. A compound of claim 1, (20 R)-(3β-hydroxy-23,24-bisnor-5-cholen-22-yl)-guanidinium acetate.

14. A compound of claim 1, (23,24-bisnor-5α-chol-3-en-22-yl)-guanidinium acetate.

* * * * *